United States Patent [19]

Kirschenmann

[11] Patent Number: 4,515,823

[45] Date of Patent: May 7, 1985

[54] PROCESS FOR SEPARATION OF RAW MILK INTO CREAM AND SKIM MILK WHICH IS PASTEURIZED

[75] Inventor: Bernd R. G. Kirschenmann, Hamburg, Fed. Rep. of Germany

[73] Assignee: Alfa-Laval AB, Tumba, Sweden

[21] Appl. No.: 480,882

[22] Filed: Mar. 31, 1983

[30] Foreign Application Priority Data

Mar. 31, 1982 [SE] Sweden .................................. 8202048

[51] Int. Cl.³ ................................................ A23C 1/00
[52] U.S. Cl. ...................................... 426/491; 165/66; 426/522
[58] Field of Search .............. 426/491, 580, 586, 522; 165/66

[56] References Cited

U.S. PATENT DOCUMENTS 3,041,046  6/1962  Nellis et al. ........................... 165/66
3,983,257  9/1976  Malmberg et al. .................. 426/491

*Primary Examiner*—George Yeung
*Attorney, Agent, or Firm*—Cyrus S. Hapgood

[57] ABSTRACT

A process for separation of raw milk by centrifugal separation into cream, which is cooled in a first heat exchanger, and into skim milk which is heated to pasteurization and cooled by regenerative heat exchange in a second heat exchanger, is described. The characteristic feature is that the feed of raw milk is separated into two part streams, of which the first is heated in the second heat exchanger to separation temperature, while the second part stream is heated in the first heat exchanger and is then combined with the first part stream and centrifugally separated.

3 Claims, 3 Drawing Figures

PROCESS FOR SEPARATION OF RAW MILK INTO CREAM AND SKIM MILK WHICH IS PASTEURIZED

The present invention relates to a process for separating a flow of raw milk (a first milk stream) by centrifugal separation into a skim milk stream (a second milk stream with reduced fat content) and a cream stream (a third milk stream with increased fat content). The raw milk flow, fed at a relatively low temperature, is heated to a centrifugal separating temperature, whereupon, after the separation, the skim milk stream is heated in a first heat exchanger section and is then heated further to pasteurization in a second heat exchanger section, by heat exchange with steam or hot liquid. The skim milk stream thus pasteurized is cooled by heat exchange in the first heat exchanger section and is then cooled further in a third heat exchanger section, whereupon the skim milk stream may be cooled further in a fourth heat exchanger section by heat exchange with ice water or the like, while the cream stream is cooled in a fifth heat exchanger section.

Such processes are previously known. Plate heat exchangers are generally used for the heat transfer, and the first through the fourth heat exchanger sections are usually combined into one unit, that is, the plates contained in them are mounted in the same frame, with different heat exchanger sections. The fifth heat exchanger section is generally a separate plate heat exchanger.

Normally the heat-giving and heat-accepting streams are directed countercurrently.

As it is desirable that the cream stream leave the system at a relatively low temperature, about 8° C., it has hitherto been usual to cool, in the fifth heat exchanger section, the cream stream coming from the centrifugal separator (which is at separation temperature, about 50° C.), with ice water or the like.

To achieve pasteurization temperature in the second heat exchanger section, steam or heat liquid energy is consumed. With rising energy costs, both for cooling and for heating, the known process mentioned previously has appeared to be more and more expensive to carry out, calculated per treated weight unit of raw milk.

Another drawback with a process of the known kind previously mentioned is that the heat-giving and the heat-accepting streams in the third heat exchanger section are not equally large, which means that the desired degree of heat recovery is not achieved. This circumstance has been accentuated recently, as the energy costs have made degrees of heat recovery in the order of 95% necessary.

In view of the need for a possibility to manufacture cream with a varying fat content, greatly varying separation temperatures are obtained with conventional apparatus, which is especially obvious at high degrees of heat recovery.

The principal object of the present invention is to provide a process of the type mentioned previously which achieves the best possible heat economy as well as the best possible operational conditions. According to the invention, the process is characterized in that the flow of raw milk is divided into two partial streams of which the first one is heated in the third heat exchanger section and the second partial stream is heated in the fifth heat exchanger section, whereupon the two partial streams are combined before being subjected to said centrifugal separation.

According to an especially suitable embodiment of the process, the flow of raw milk is divided in such a way that the second partial stream is substantially as large as the cream stream, whereby the heat-giving and heat-accepting streams in the third heat exchanger section will be substantially equally large. Thus, it is possible to obtain an optimal degree of heat recovery and the desired separation temperature at varying operational conditions.

The invention will now be described more in detail, reference being made to the attached drawings in which FIG. 1 is a diagrammatic view of a process of the known type mentioned previously;

Figure 1:
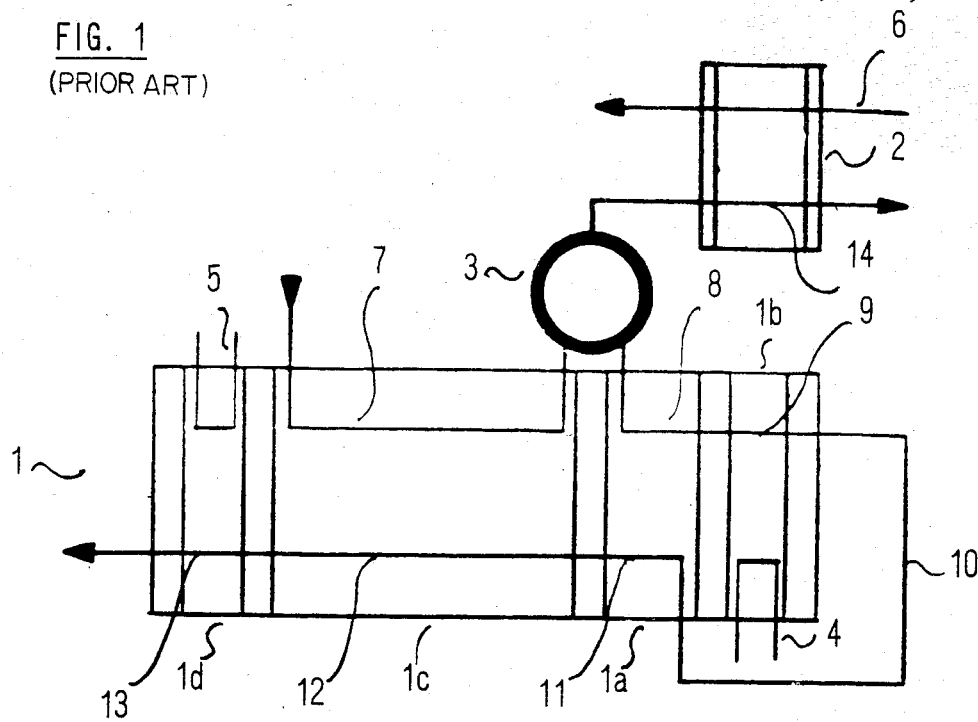
Figure 2:
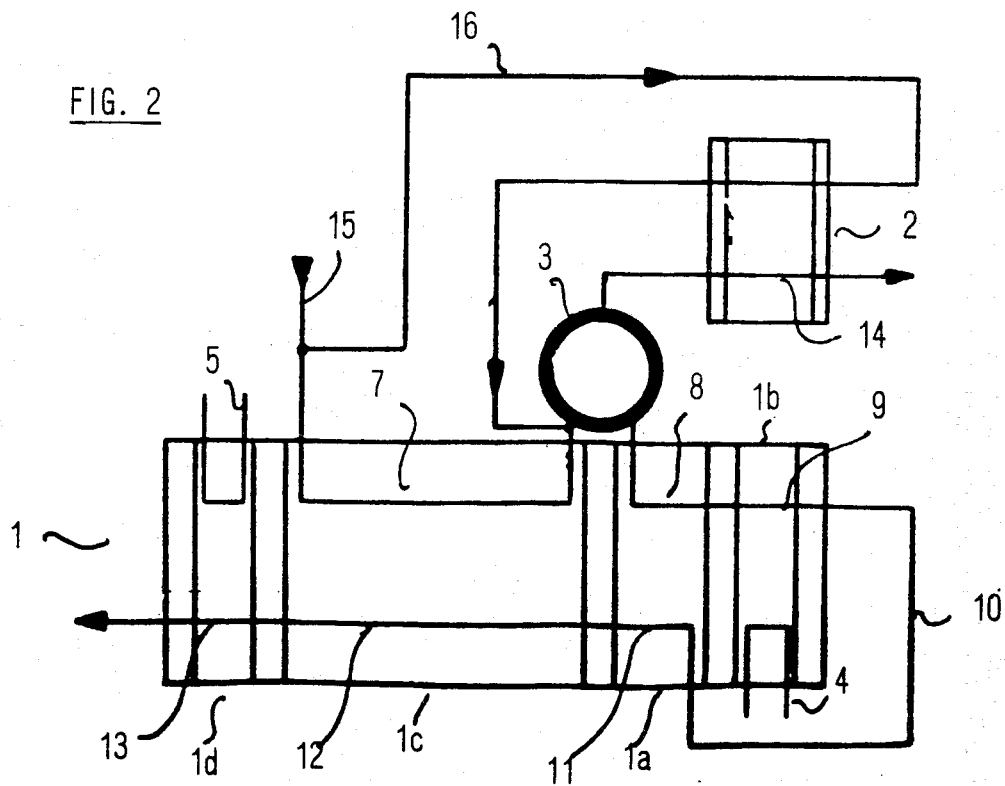
FIG. 2 is a similar view of a process according to the invention.

In FIGS. 1 and 2, a first plate heat exchanger 1 has heat exchanger sections 1a, 1b, 1c and 1d. A second plate heat exchanger is shown at 2 and a centrifugal separator at 3. The heat exchanger section 1b is provided with a steam circuit 4, and heat exchanger section 1d has a cooling water circuit 5. In FIG. 1, the plate exchanger 2 is provided with a cooling water circuit 6. Also, the system in FIG. 1 forms a flow path 7 for feeding raw milk through the heat exchanger section 1c to the centrifugal separator 3 from which a first separated component flows in a path comprising a part 8 through the heat exchanger section 1a, a part 9 through the heat exchanger section 1b, an outer line 10, a part 11 returning through the heat exchanger section 1a, a part 12 returning through the heat exchanger section 1c, and a part 13 through the heat exchanger section 1d. The reference numbers 7–13 denote corresponding elements in FIG. 2. In FIGS. 1 and 2, the second separated component flows from the centrifugal separator 3 in a path 14 through the heat exchanger 2. In FIG. 2, a feed line 15 is provided for the first milk stream, that is, the raw milk; and a first part of this first milk stream flows in a path 16 through the heat exchanger 2.

A conventional plant, as shown in FIG. 1, operates in such a way that the raw milk enters cold, is heated in the heat exchanger section 1c and is separated in the centrifugal separator 3 into a cream stream, which is cooled by ice water or the like in the plate heat exchanger 2, and into a skim milk stream which, in the paths 8 and 9 through the heat exchanger sections 1a and 1b, is heated to pasteurization temperature. The pasteurized milk is then cooled while flowing through the paths 11, 12 and 13 in the heat exchanger sections 1a, 1c and 1d, finally with ice water or the like.

In a system according to the invention, as shown in FIG. 2, the raw milk fed through line 15 is separated into a first part stream which is heated in the path 16 in plate exchanger 2. At the same time a cream stream from centrifugal separator 3 is cooled in exchanger 2, and a second part of stream 15 is heated in the path 7 in heat exchanger section 1c. The two part streams are then combined and go to the centrifugal separator 3 for separation into a cream stream and a skim milk stream. The latter stream is pasteurized and cooled in a manner similar to that described for the conventional process shown in FIG. 1.

Figure 3:
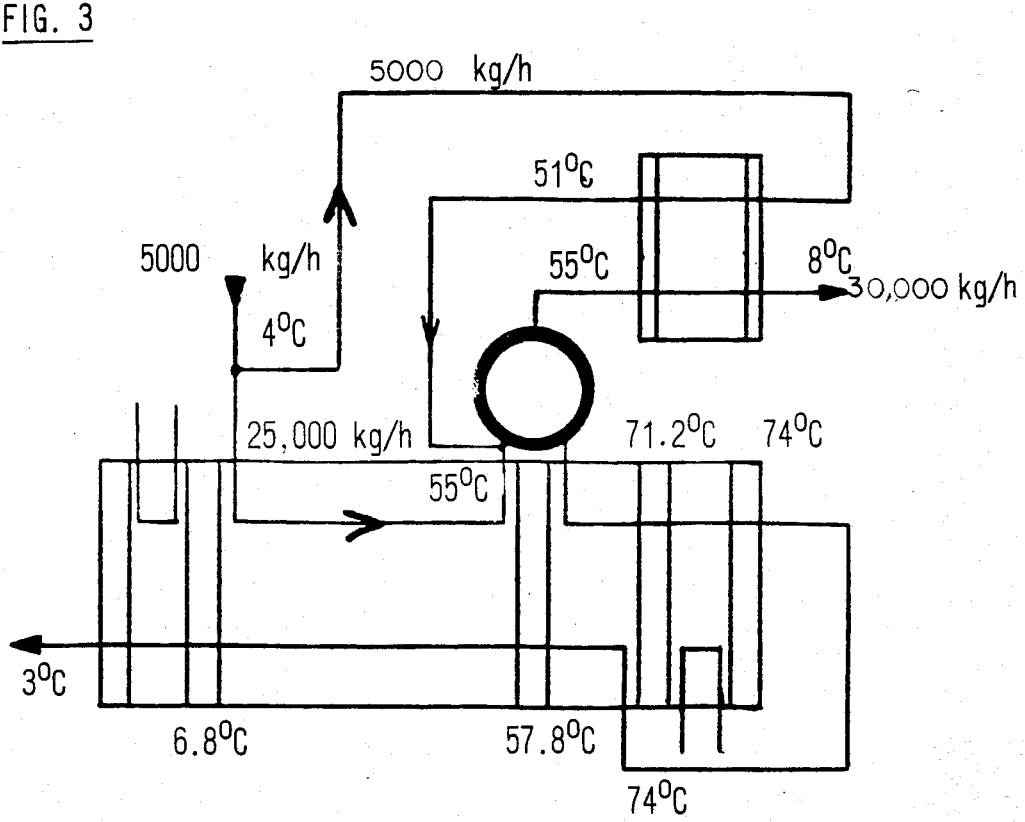
FIG. 3 is the same view as FIG. 2 but with an example of stream flows and temperatures when carrying out the process.

In FIG. 3, an example of operational data for stream flows and temperatures, utilized when carrying out the new process, is given.

It may be mentioned that a comparison between the costs for treating 30,000 kgs/h milk according to a conventional process and according to the invention shows a substantial reduction of costs for heating and cooling, as is shown below (relative costs):

|  | Conventional Process | Invented Process |
|---|---|---|
| Heating | 61.7 | 19.7 |
| Cooling | 7.2 + 31.1 | 16.2 |
| Total energy cost | 100.0 | 35.9 |

The capital costs are somewhat greater for the invented process, as the heat transfer area has been increased to some degree in order to optimize the heat recovery.

I claim:

1. In the processing of milk by centrifugally separating a flow of raw milk into a stream of skim raw milk and a stream of cream, heating said milk flow to a separating temperature prior to said centrifugal separating, heating said skim milk stream in a first heat exchanger section and then further heating it to pasteurization in a second heat exchanger section by heat exchange with a hot medium, cooling the pasteurized skim milk stream by heat exchange in said first heat exchange section, then further cooling said pasteurized skim milk stream in a third heat exchanger section, and cooling said cream stream in an additional heat exchanger section, the improvement which comprises dividing said raw milk flow into first and second partial streams prior to said centrifugal separating, heating said first partial stream in said third heat exchanger section, heating said second partial stream in said additional heat exchanger section, and then combining said partial streams and subjecting them to said centrifugal separating.

2. The improved processing of claim 1, in which said skim milk stream, after cooling in said third heat exchanger section, is further cooled in a fourth heat exchanger section by heat exchange with a cooling medium.

3. The improved processing of claim 1, in which said dividing of said milk flow is such that said second partial stream is substantially as large as said cream stream, whereby the heat-giving and heat-accepting streams in said additional heat exchanger section are substantially equally large.

* * * * *